June 16, 1936.　　　R. A. FORESMAN　　　2,043,994
HEAT GENERATOR
Original Filed Feb. 24, 1933　　2 Sheets-Sheet 1
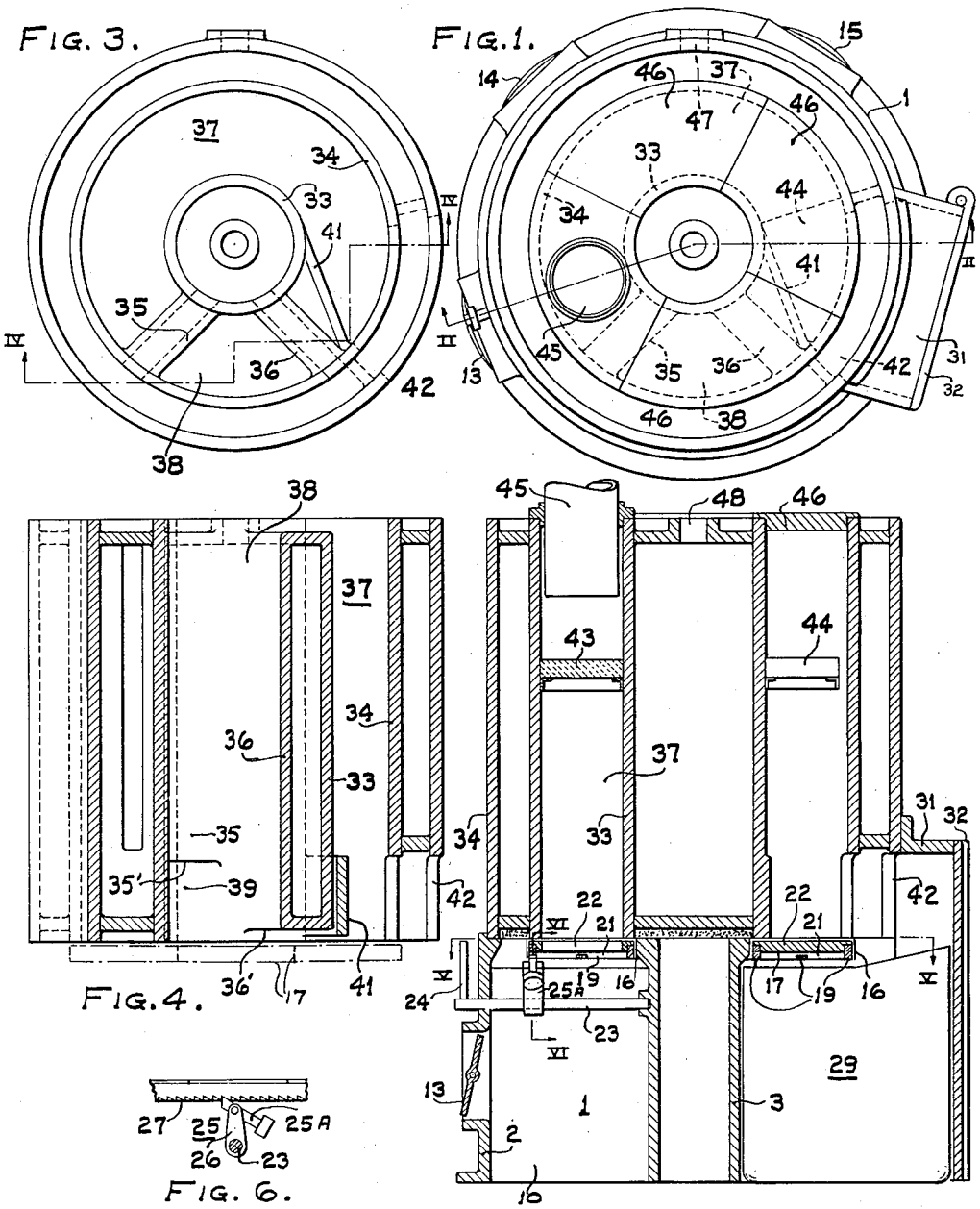
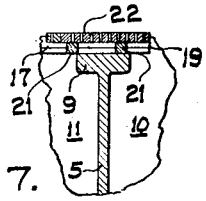
WITNESSES:　　　　　　　　　　　　　　　　INVENTOR

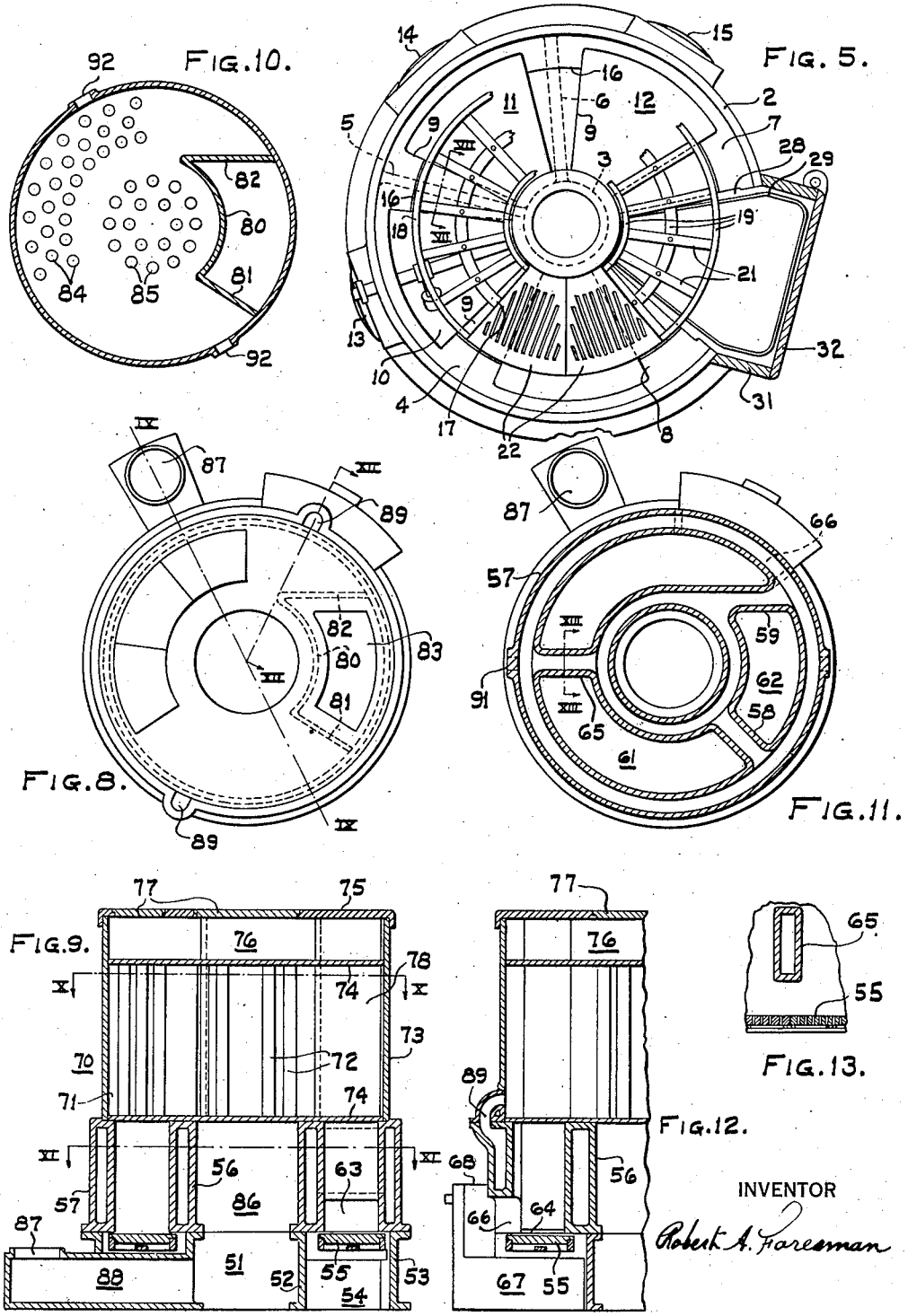

Patented June 16, 1936

2,043,994

UNITED STATES PATENT OFFICE 2,043,994

HEAT GENERATOR

Robert A. Foresman, Prospect Park, Pa.

Application February 24, 1933, Serial No. 658,334
Renewed July 2, 1935

11 Claims. (Cl. 122—30)

My invention relates to combustion apparatus, more particularly to a furnace adapted to a mechanical stoker employing an annular grate for feeding the fuel and discharging the ash and has for its object the provision of apparatus of the character designated, that is simple in design, rugged in construction and easy to operate and maintain.

A further object of my invention is to provide a heat generator which is particularly adapted to supplying heat used for domestic purposes.

A further object of my invention is to provide a heat generator which will satisfactorily burn different sizes and kinds of fuel equally well, particularly the fuels classed as low grade fuels.

A still further object of my invention is to provide a heat generator in which the design of the furnace, grate and heat absorbing elements conform to the service requirements of each and of one to the other.

A still further object of my invention is to provide a heat generator for domestic purposes which is pleasing in appearance, compact in form, clean, and can be operated and maintained with a small amount of labor and skill.

These and other objects are effected by my invention, as will be apparent from the following description and claims, taken in connection with the accompanying drawings, forming a part of this application, in which:—

Fig. 1 is a plan view of a heat generator constructed in accordance with my invention;

Fig. 2 is a sectional view taken along the line II—II of Fig. 1;

Fig. 3 is a plan view similar to Fig. 1 with parts removed for clearness;

Fig. 4 is a section taken along the line IV—IV of Fig. 3;

Fig. 5 is a sectional view taken along the line V—V of Fig. 2;

Figs. 6 and 7 are sectional views of details and are taken, respectively, along the lines VI—VI of Fig. 2 and VII—VII of Fig. 5;

Fig. 8 is a plan view of a heat generator, constituting a second embodiment of my invention;

Fig. 9 is a section taken along the line IX—IX of Fig. 8;

Figs. 10 and 11 are sectional views taken along the lines X—X and XI—XI of Fig. 9, respectively;

Fig. 12 is a section taken along the line XII—XII of Fig. 8; and,

Fig. 13 is a sectional view of a detail and is taken along the line XIII—XIII of Fig. 11.

Referring now to Figs. 1 to 7, inclusive, the numeral 1 indicates a base, having an outer wall 2, an inner column 3, and radially extending webs or division walls 4 to 8, inclusive. The latter are each provided with flanges 9 at their upper ends for a purpose to be referred to hereinafter. The division walls 4 to 7, inclusive, divide the base 1 into a plurality of arcuate wind boxes 10, 11, and 12, the admission of air to which is controlled by dampers 13, 14, and 15, respectively.

The upper ends of the walls 4 to 8, inclusive, are provided with recesses 16, within which a rotatable grate structure 17 is carried. The latter includes a frame 18 having a plurality of circular rings 19 secured together by radial arms 21. The frame 18 may be formed of sections which are secured together in end to end relation in any convenient manner. Segmental grate sections 22 are disposed upon the frame 18 in end to end relation and provide a smooth, continuous surface for supporting the fuel and admitting air for combustion. The grate sections 22 rest upon the radial arms 21, and provide, with the flanges 9 of the radial division walls 4 to 8, inclusive, a continuous moving air seal, as best shown in Fig. 7. Air admitted to the box 10 is prevented from passing over the wall and thence through the grate section above the wind box 11 by means of the radial arms 21. The latter are spaced apart a distance somewhat less than the width of the flange 9.

The grate structure 17 may be rotated by any suitable means which may include a shaft 23, journaled in the base 1, a reciprocable lever 24 secured to the shaft 23, and a ratchet mechanism 25 adjacent the grate structure 17. The ratchet mechanism 25 includes a pawl 25A pivoted in an arm 26 which is secured to the shaft 23. The pawl 25A cooperates with a toothed ratchet 27 secured to the grate structure 17. The ratchet 27 may be formed in the outer ring 19 of the frame 18 as shown. As the lever 24 is reciprocated, the pawl 25A advances the grate structure 17, step by step.

The radial division walls 7 and 8 define an arcuate chamber 28 beneath the grate 17 for accommodating a removable refuse receptacle 29. The latter extends beyond the outer edge of the grate 17 for receiving refuse discharged therefrom as described hereinafter. A substantially dust tight housing 31 encloses the outer portion of the receptacle 29 and includes a door 32 for providing access to the receptacle 29.

A vertical annular column 33 for water to be heated is carried by the base 1 adjacent the center thereof and a cylindrical wall 34 having a water space therein is carried by the base adjacent its outer edge. The column 33 and the wall 34 define an annular chamber therebetween above the grate 17. Circumferentially spaced walls 35 and 36 connect the column 33 to the cylindrical wall 34 and are provided with spaces for fluid to be heated, which spaces communicate with the spaces of the outer wall 34 and the column 33. The walls 35 and 36 divide the annulus between the outer wall 34 and the column 33 into two arcuate spaces, one of which is a combustion chamber 37 and the other of which is a fuel magazine 38.

The circumferentially spaced or fuel magazine walls 35 and 36 extend from adjacent the top of the outer cylindrical wall 34 and the column or inner wall 35 toward the grate; the magazine wall 35 terminating at 35' (Fig. 4) in spaced relation with the grate 17 to define a fuel discharge opening 39. The magazine wall 36 terminates adjacent the grate 17 as shown at 36', the small space therebetween being for working clearance only. The wall 36 may be arranged at a tangent to the inner wall or column 33 for deflecting refuse outwardly of the grate 17 as the latter is rotated, as shown in Fig. 11, but I prefer in the present embodiment, to employ a deflecting plate 41, secured within the combustion chamber 37 for this purpose. An opening 42 is provided in the outer wall 34 adjacent the magazine wall 36 for the passage of refuse from the grate 17 to the receptacle 29.

A gas baffle 43 supported within the combustion chamber 37 extends from adjacent the magazine wall 35 around the combustion chamber 37 and terminates in spaced relation with the wall 36 to form a gas discharge opening 44. An outlet 45 for the discharge of waste gases from the furnace is arranged adjacent the wall 35. A tortuous path for the hot gases is provided by the baffle 43 as they traverse the combustion chamber in contact with the heat-absorbing walls thereof.

The magazine 38 and combustion chamber 37 are sealed at the top by segmental plates 46 to prevent air from entering or gas leaving the same. The segmental plate 46 above the fuel magazine 38 may be removable for the periodic admission of fuel to the magazine. Fluid to be heated may enter the outer wall 34 through an opening 47 and the heated water or vapor or steam is conveyed from the inner wall or column 33 through opening 48.

Operation

As the grate 17 is rotated by the ratchet mechanism 25, fuel for the magazine is carried thereby through the opening 39 which determines the thickness of the fuel bed. A uniform thickness of fuel is maintained over the entire width of grate as it enters the combustion chamber 37. The fuel ignites as it enters the combustion chamber 37 and, as it is advanced by the continued rotation of the grate, it passes through successive stages of combustion, until it is consumed and nothing but refuse remains on the grate. As the grate passes beneath the angularly positioned deflecting plate 41, refuse carried thereon engages the plate 41 and is moved outwardly through the opening 42 and into the receptacle 29. The fuel is not only ignited by entering the combustion chamber 37 but the hot gases are drawn from the combustion chamber 37, through the passages between the grate and the magazine walls 35 and 36, to the furnace outlet by the draft, thereby passing over and around the fuel lying on the grate at the bottom of the magazine for increasing the rate of ignition. This effect is advantageous as it facilitates ignition and provides for greater rates of combustion or capacity. Furthermore, when the fire is banked for long periods, the ignition is carried back to the fuel within the magazine, which is also advantageous.

The dampers 13, 14, and 15 may be adjusted to vary the number of effective combustion zones in the combustion chamber 37 and also to vary the rate of combustion in each zone so that greater refinement in regulation of the fire may be obtained.

The annular furnace walls provide a relatively large amount of vertical heating surface in contact with the burning fuel and closely exposed to the radiant heat produced by it. This, combined with the effect of the gas baffle 43 above the fuel bed causing the gases to travel the furnace in a substantially parallel plane to the grate, results in a large amount of heat being absorbed by these wall surfaces, both by radiation and convection. The smooth vertical walls of the furnace offer little opportunity for soot or dust to lodge upon them and remain. Therefore, their heat absorbing efficiency will always remain high and it will not be necessary to allow for a lower heat-absorbing efficiency after the unit has been in service for some time.

The mechanical discharge of the refuse from the grate, storing it in the sealed chamber in the container and removing it bodily therefrom eliminates to a very large degree the dust and dirt considered to be necessary in the manual cleaning and handling of a furnace.

The combustion performance of the annular grate and furnace is somewhat analogous to the same performance of a chain grate. The principal point in which they differ in this respect is that the draft differential between the fuel inlet to the furnace and the refuse outlet causes a part of the gases produced in the inlet of the furnace, to flow around the furnace in one direction and another part of the gases to flow around the furnace in the opposite direction, pass beneath the fuel hopper in the direction of the refuse outlet, thereby increasing the rate of ignition and continue on until they join the gases coming from the opposite direction and with them continue on their way to the gas outlet of the furnace.

Reference will now be had to Figs. 8 to 13, inclusive, showing a second embodiment of my invention in which I superimpose a heat-absorbing element on the furnace of my heat generator. The base 51 in this embodiment includes concentrically arranged inner and outer walls 52 and 53 which define an annular chamber 54 therebetween. A grate 55 similar to the grate 17 of the prior embodiment may be arranged within the chamber 54 and rotatably supported by the base 51. It will be understood that the base 51 may be divided into separate wind boxes and may support the grate driving mechanism in the manner previously disclosed. Repetition of these details in the drawings is not believed to be necessary.

The base 51 supports inner and outer walls 56 and 57, respectively, each of which includes a space for fluid to be heated and which defines an annulus therebetween. Circumferentially spaced walls 58 and 59 connect the inner and outer walls 56 and 57 and are provided with fluid passages which communicate with the fluid spaces of the walls 56 and 57. The circumferentially spaced walls 58 and 59 divide the annulus into arcuate spaces, one of which is a combustion chamber 61 and the other of which is a fuel magazine 62. The circumferentially spaced or fuel magazine walls 58 and 59 extend from adjacent the tops of the walls 56 and 57 toward the grate; the wall 58 terminating in spaced relation to the grate 55 to define a fuel discharge opening 63 and the wall 59 terminating adjacent the grate 55, as shown at 64 in Fig. 12.

An additional wall 65, having a fluid passage, may be radially arranged in the combustion chamber 61 and connecting the walls 56 and 57; the fluid passage of the wall 65 communicating with the fluid spaces of the walls 56 and 57. The lower edge of the wall 65 is arranged a sufficient distance above the grate 55 so that it does not engage the bed of fuel carried by the grate.

In the present embodiment, the fuel magazine wall 59 is tangentially arranged with respect to the grate 55 as shown in Fig. 11 and functions to deflect refuse from the grate 55 as the latter is rotated. The refuse which is moved radially of the grate by the wall 59 passes through an opening 66 in the wall 57. A receptacle 67 is arranged adjacent the opening 66 for receiving the discharge refuse. A substantially dust tight casing 68 encloses the receptacle 67.

The upper part of the heat generator in the present embodiment includes heat-absorbing element 70 which is superimposed on the walls 56 and 57 and which includes a fluid space 71 and gas passages or tubes 72. The element 70 also includes a cylindrical casing 73 and end plates 74 in which the ends of the tubes 72 are secured. The casing 73 extends above the top plate 74 and is provided with a cover 75 for defining a gas chamber 76. Doors 77 are provided in the cover 75 for permitting access to the tubes 72 for cleaning or repairing.

The element 70 includes an upper portion 78 of the fuel magazine which is aligned, substantially, with the magazine 62 in the lower part of the heat generator. Partitions 80, 81, and 82 separate the upper magazine portion 78 from the water space 71 and are aligned substantially with the walls 56, 58, and 59, respectively, of the magazine 62. The partitions 80, 81, and 82 extend upwardly to the top wall 77 in which a door 83 is fitted for providing access to the fuel magazine.

The tubes 72 may be divided into groups 84 and 85; the group 84 providing communication between the combustion chamber 61 and the gas chamber 76 and the group 85 providing communication between the gas chamber 76 and a central chamber 86. The latter is defined by the inner walls 52 and 56 and is connected to the gas outlet 87 by means of a duct 88 provided in the base 51.

The fluid spaces of the upper and lower parts of the heat generator communicate as shown at 89. Fluid to be heated may be admitted to the fluid spaces of the wall 57 through an opening 91 and the heated water is discharged from the water space 71 through the openings 92.

The operation of the heat generator of the present embodiment is similar to that of the prior one. Fuel is conveyed from the magazine by the grate, the depth of fuel being determined by the height of the opening 63. It is progressively consumed as the grate advances until nothing but refuse remains. The refuse is deflected from the grate to the receptacle 67, as previously described, by the wall 59. In the present embodiment hot gases from the combustion chamber pass through the group 84 of the tubes 72 to the gas chamber 76 and thence through the tube group 85 to the gas outlet 87 by way of the chamber 86 and duct 88.

In accordance with the construction of the present embodiment, I am enabled to obtain all of the advantages of the annular furnace and grate in one part and all of the advantages of established designs in heat-absorbing apparatus in another part.

From the foregoing, it will be apparent that I have devised improved heat generating apparatus which is of rugged construction and which may be operated over long periods of time without attention, making it particularly adaptable to domestic heating.

While I have shown my invention in two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In combination apparatus, the combination of a rotatable annular grate, inner and outer substantially concentric walls, each provided with water spaces, a top wall connecting the inner and outer walls, circumferentially spaced walls connecting the inner to the outer walls and extending from the top wall toward the grate to define a fuel magazine, each of said circumferentially spaced walls being provided with a water space communicating with said water spaces of the inner and outer walls, one of the circumferentially spaced connecting walls terminating at its bottom in spaced relation with the grate to define the depth of fuel fed to the grate, and means for admitting fuel to the magazine.

2. In combustion apparatus, the combination of a rotatable annular grate, an outer wall disposed adjacent the periphery of said grate and having a space formed therein for water to be heated, and a fuel magazine disposed so as to feed fuel onto the grate and including circumferentially spaced walls joined to said outer wall and having water spaces therein communicating with said space of the outer wall, one of said circumferentially spaced walls having a portion thereof spaced from the grate to define a fuel discharge opening, the other of said circumferentially spaced walls having means cooperating with the grate to deflect refuse outwardly thereof.

3. In combustion apparatus, the combination of a rotatable annular grate, inner and outer substantially concentric walls each provided with spaces for fluid to be heated, a top wall connecting the inner and outer walls, means for admitting fluid to be heated to the space of said outer wall, circumferentially spaced walls connecting said inner and outer walls and provided, respectively, with spaces communicating with the spaces of said inner and outer walls for the circulation of fluid to be heated from the outer wall to the inner wall, said circumferentially spaced walls extending downwardly toward the grate to define a magazine for the gravitational feed of fuel to the grate, and means for conveying heated fluid from said inner wall.

4. In combustion apparatus, the combination of a rotatable annular grate, inner and outer substantially concentric walls, each provided with water spaces, a top wall connecting the inner and outer walls, first and second means extending, respectively, between the inner and outer walls and toward the grate and forming water-containing spaces communicating with the water spaces of the inner and outer walls, said first and second means being spaced circumferentially from each other to provide a fuel magazine for the gravitational feeding of fuel to a portion of the annular grate, means located near said first means for controlling the depth of fuel feed to the grate, means located near said second means for deflecting refuse from the grate, and means for admitting fuel to the magazine.

5. In combustion apparatus, the combination of a rotatable annular grate, a furnace wall disposed adjacent the periphery of said grate and having a space formed therein for fluid to be heated; vertically extending, circumferentially spaced first and second wall means extending inwardly from the furnace wall toward the center of the latter and arranged at their inner ends to provide a fuel magazine for the gravitational feeding of fuel to a portion of the annular grate, said first and second wall means having spaces therein connected to the fluid spaces of the furnace wall, means located near said first wall means for controlling the depth of fuel feed to the grate, means located near said second wall means for deflecting refuse from the grate and means for admitting fuel to the magazine.

6. Combustion apparatus comprising upper and lower parts; the lower part including a rotatable annular grate, inner and outer walls each provided with spaces for fluid to be heated, circumferentially spaced walls connecting said inner and outer walls, said circumferentially spaced walls extending from the top of the inner and outer walls toward the grate to define the lower section of a magazine for the gravitational feed of fuel to the grate; said upper part including means providing fluid and heating gas spaces and an upper section of the fuel magazine; means providing for the admission of fuel to said upper section of the fuel magazine; and means affording communication of the fluid spaces of said upper and lower parts.

7. In combustion apparatus, the combination of a rotatable annular grate, a boiler structure arranged above the grate, means forming a part of the heating surface of the boiler structure and spaced above the grate to provide a fuel outlet and means for admitting fuel to the inlet side of the outlet, whereby, as the grate is rotated, the fuel on the grate is leveled by said means and the depth of the fuel bed maintained substantially constant.

8. In combustion apparatus, the combination of a rotatable annular grate, a boiler structure arranged above the grate, means forming a part of the heating surface of the boiler structure for dividing the same into combustion and fuel receiving chambers, said last-mentioned means having a portion thereof spaced vertically above the grate for defining therewith a fuel discharge orifice, and means for admitting fuel to said fuel receiving chamber to be advanced through the orifice into the combustion chamber as the grate is rotated, whereby the bed of fuel on the grate is leveled off and its depth determined.

9. Combustion apparatus comprising a rotatable annular grate, an outer wall disposed about the perimeter of the grate, a pair of walls joined at their inner ends adjacent the central portion of the grate and extending transversely of the grate, said transversely extending walls and a portion of said outer wall defining a fuel magazine for the gravitational feeding of fuel to the grate, one or more of the walls defining the fuel magazine having a water space formed therein, means for admitting fuel to the magazine and means for rotating the grate.

10. Combustion apparatus comprising upper and lower sections; the lower section including a rotatable annular grate, including an outer wall adjacent the periphery of the grate having a space therein for fluid to be heated and including circumferentially spaced walls joined at their inner ends and connected to said outer wall, said circumferentially spaced walls extending downwardly toward the grate to define a magazine for the gravitational feeding of fuel to the grate; said upper section including separated fluid heating and combustion gas spaces; means affording communication between the fluid heating spaces of said upper and lower sections and means providing for admission of fuel to said magazine.

11. Combustion apparatus comprising first and second sections; said first section including a rotatable annular grate, including an outer wall having spaces for water to be heated and defining a combustion chamber above a first portion of the grate and including means defining a fuel receiving chamber above a second portion of the grate, said means including a wall member having a portion thereof spaced above the grate for levelling fuel as it is advanced onto the combustion chamber by movement of the grate; said second section including a chamber for water to be heated and including a plurality of tubes projecting through the chamber for conveying products of combustion from said combustion chamber; means providing communication between the water chamber of the second section and said spaces of the outer wall of the first section, means for admitting fuel to said fuel receiving chamber and means for rotating the grate.

ROBERT A. FORESMAN.